(No Model.)
W. P. BROWN.
PLOW ATTACHMENT.
No. 308,745. Patented Dec. 2, 1884.
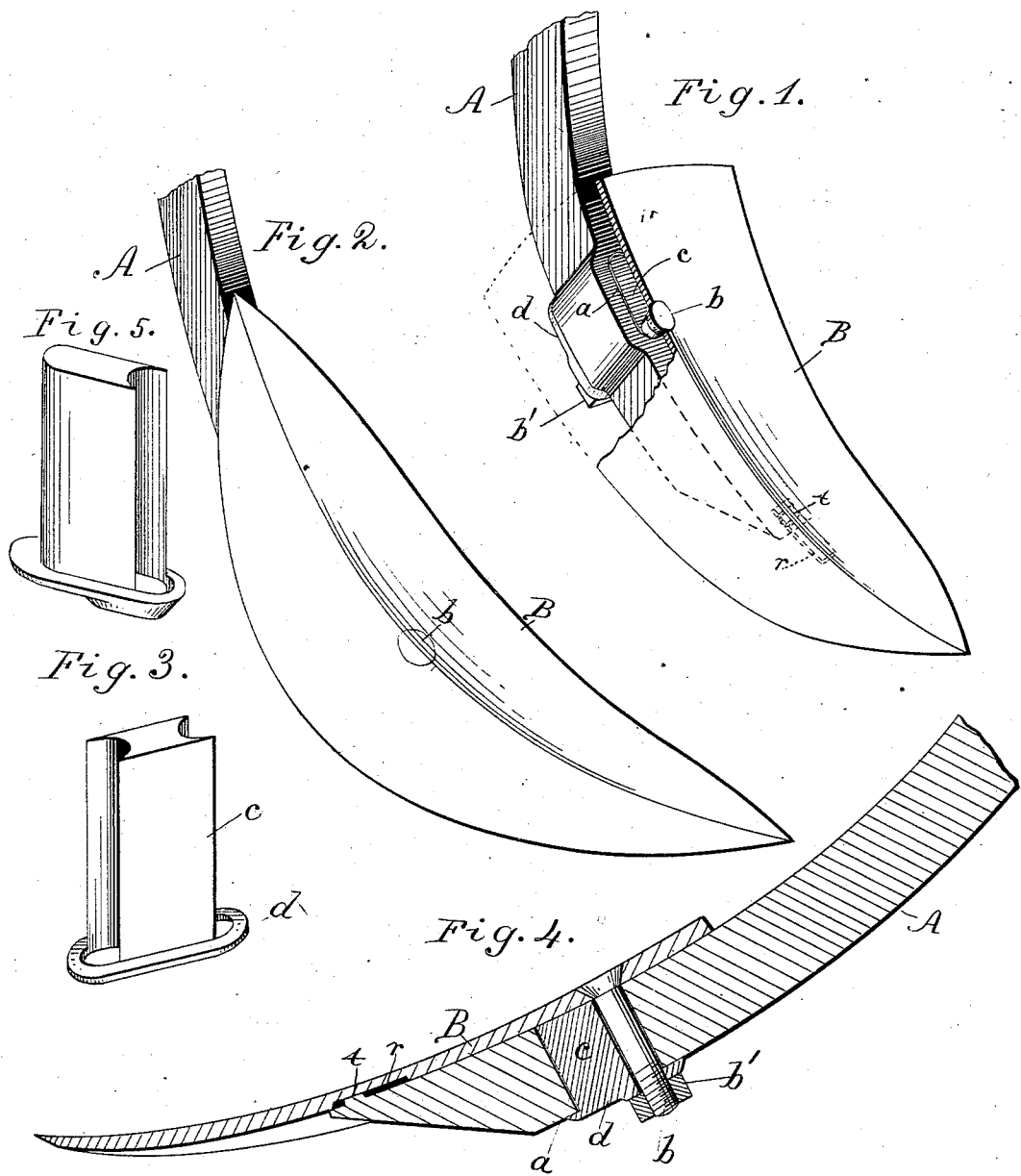
WITNESSES:
Thos. Houghton.
Edw. W. Byrn.
INVENTOR:
Wm. P. Brown
BY Munn & Co.
ATTORNEYS.

UNITED STATES PATENT OFFICE.

WILLIAM P. BROWN, OF ZANESVILLE, OHIO.

PLOW ATTACHMENT.

SPECIFICATION forming part of Letters Patent No. 308,745, dated December 2, 1884.

Application filed June 27, 1884. (No model.)

*To all whom it may concern:*

Be it known that I, WILLIAM P. BROWN, a citizen of the United States, residing in Zanesville, in the county of Muskingum and State of Ohio, have invented certain new and useful Improvements in Plow Attachments, of which the following is a description.

Figure 1 is a perspective view from the front of a single-point plow with a part of the latter broken away, showing its connection to the standard. Fig. 2 is a perspective view showing a double-pointed plow. Fig. 3 is a detail in perspective of a modification of the filling-block. Fig. 4 is a vertical longitudinal section showing a different position of the filling-block from that shown in Fig. 1. Fig. 5 is a perspective view of the filling-block shown in Figs. 1 and 4.

My invention relates to the attachment of plows or cultivator-blades to their standards.

The object of the invention is to form an adjustable connection that will allow the shovels or plows to be made unusually long, so that as they wear away they may be set lower to prolong the longevity of the blade, and also provide for setting one shovel to work on a higher plane than the other, where the plants to be cultivated are on a ridge or bed, with a center furrow lower than the row of plants, whereby one shovel works on the bed, the other in the furrow, and also to make a simple and strong connection with but a single attaching-bolt, and to secure a smooth scouring-surface for the front of the blade, and to protect the connection of the bolt with the standard, as hereinafter described.

The improvement consists in combining the following elements: A solid standard having a slot in it, a bolt passing through this slot and the shovel to secure the latter to the standard, a filling block or plug which fills the complement of space in the slot between the bolt and the end of the slot, and permits the bolt to be placed above or below the said filling block or plug, and a washer which covers the rear side of the slot, or such portion of it as will provide for a proper bearing for the nut, the said washer being either made solid and in one piece with the filling-block or separate therefrom, or may be formed on the face of the nut as a part of the nut, or the nut have a wide base, which will serve the purpose of both washer and nut, as desired.

In the drawings, A represents the plow-standard, which is curved to permit a long shovel-plate, B, to be used, and which shovel may be a single-pointed one, as in Figs. 1 and 4, or a double-pointed one, as in Fig. 2. The standard is made solid, and is formed with a slot, *a*, in the same near its lower end, through which passes the bolt *b*, that secures the shovel B to the standard, and which bolt is provided with a nut, *b'*, at the rear. In the slot between the bolt and the end of the slot, is a metal filling block or plug, *c*, which, as shown, is formed in one piece with the washer *d*, which washer is made in this case oblong, to cover the whole of the slot and keep out the dirt and trash. This filling-block may, however, be made in a separate piece from the washer, and may also be made of wood or other material. Its function is to fill the space in the slot between the bolt and the end of the slot, and thus hold the bolt to its definite position at one end of the slot irrespective of the clamping effect of the nut, so that if the nut gets loose the shovel still does not alter its position with respect to the standard.

When the shovels are first made, they are made longer than necessary, to compensate for wear, and the bolt is adjusted in the top part of the slot with the filling-block below it, as in Fig. 4. Then when the shovel becomes worn off shorter the position of the bolt is changed to the lower end of the slot, as in Fig. 1, which adjusts the shovel down to that extent, and the filling-block occupies then a position above the bolt, filling the space in the slot above it. In this adjustment it will be seen that the filling-block and washer simply require to be reversed in their position; but these parts may be made, as in Fig. 3, with a bolt-hole on each side of the filling-block, which construction does not require to be reversed. In both these cases I make the filling-block and washer in one piece; but, as before stated, these parts may be made in separate pieces, if desired. At the lower end of the standard there is formed a teat or lug, *t*, which fits in an elongated recess, *r*, in the rear of the shovel, to prevent the latter from turning on its bolt, and also provides a steady pin or lug that allows a change of distance between the bolt and lug equal to the change made by reversing the plug. This holds the shovel steady while the shovel is new and at its greatest length.

I am aware of the fact that a teat or lug is not new in connection with two holes in the shovel; but when the standard is slotted and the fastening-bolt is adjusted a definite distance from one end of the slot to the other two holes in the plow-shovel would have to be made very accurately to correspond to that adjustment. With a single elongated recess or slot in the back of the shovel no such nice adjustment is required, as the lug readily finds its own position in this recess, and, besides, said recess is formed economically with one blow of the tool.

In defining my invention with greater clearness I would state that I am aware that a solid standard with a single slot and two bolts for securing the shovel have heretofore been used, as shown in Patent No. 202,972, and that a clutch-washer has been employed for holding the bolt that secures the shovel, as shown in Patent No. 165,877; and I do not claim either of these arrangements.

Having thus described my invention, what I claim as new is—

1. The combination of a solid slotted standard, a shovel or plow, a bolt connecting the same, a filling block or plug for defining the position of the bolt in the slot of the standard, and a nut securing the bolt on the back of said slot, as and for the purpose described.

2. A filling-block and washer formed in one piece, in combination with a slotted standard, a shovel, and a bolt, as and for the purpose described.

3. The combination, with a plow-standard having a bolt-slot and a teat or lug, $t$, of the shovel or plow having a single bolt-hole and an elongated recess, $r$, the filling-block $c$, and a single bolt securing the plow to the standard, as described.

4. As a new article of manufacture, a filling-block and washer formed in one piece, as and for the purpose described.

WILLIAM P. BROWN.

Witnesses:
CHAS. W. FENSTEMAKER,
W. H. MOORE.